Aug. 8, 1944.  E. H. LANE  2,355,538
COIL WINDING APPARATUS
Filed Aug. 10, 1943
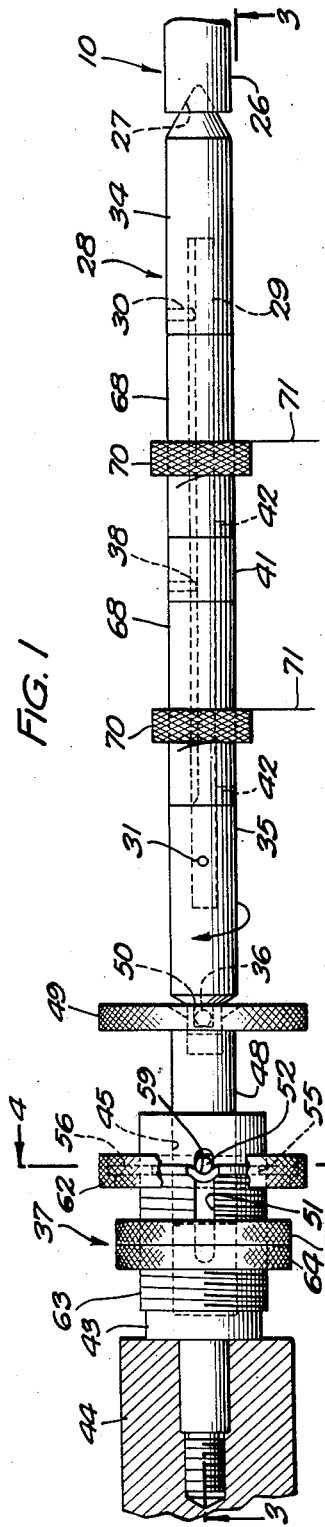
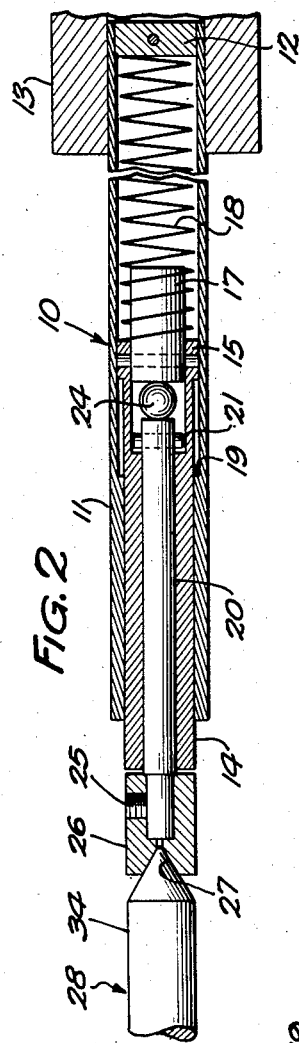
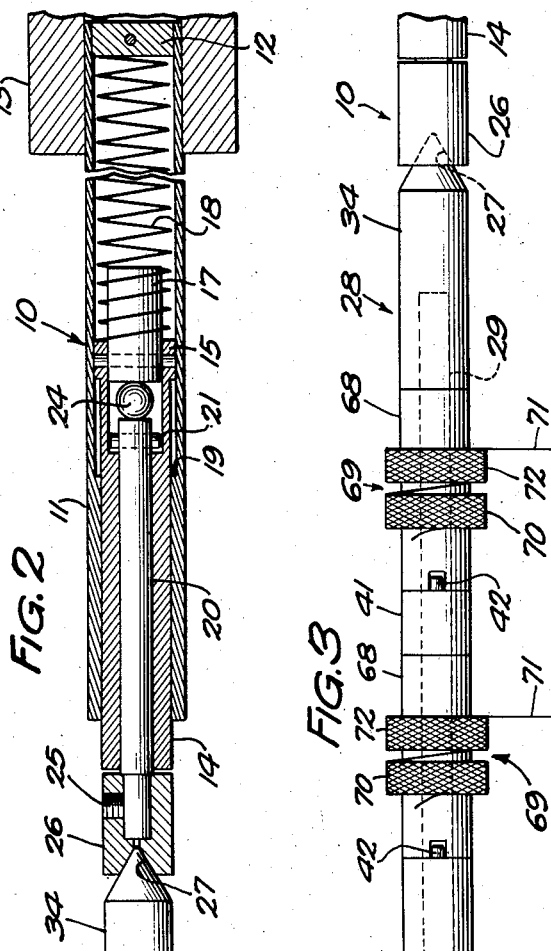
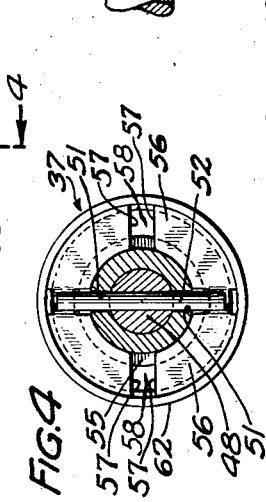
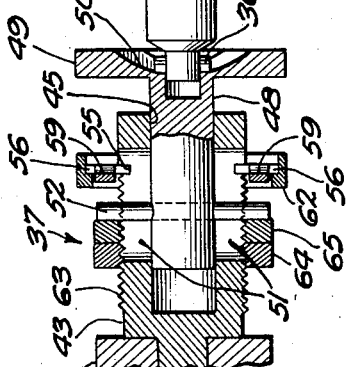
INVENTOR
E. H. LANE
BY
ATTORNEY Patented Aug. 8, 1944

2,355,538

UNITED STATES PATENT OFFICE 2,355,538

COIL WINDING APPARATUS

Edwin H. Lane, La Grange, Ill., assignor to Western Electric Company, Incorporated, New York, N. Y., a corporation of New York Application August 10, 1943, Serial No. 498,071

8 Claims. (Cl. 242—9)

This invention relates to coil winding apparatus and more particularly to adjustable indexable couplings for supporting arbors used in the winding of duo-lateral or cross-wound coils.

In the winding of high frequency coils of the duo-lateral wound type, wherein two interconnected coils are spaced a predetermined distance apart to provide a certain electrical characteristic, a plurality of such coils are wound on a longitudinally shiftable arbor; first one coil of each pair is wound simultaneously in one position of the arbor and then the companion coils thereof are simultaneously wound predetermined uniform distances from the first coils in another position of the arbor. Depending on the desired electrical characteristics of the coil to be wound, the distance between the individual coils will vary and, in some cases, only micrometrically.

An object of the present invention is to provide a simple and practicable adjustable indexable coupling, whereby a longitudinally yieldable coil winding arbor may be supported and readily adjusted to micrometrically varying longitudinal positions to accommodate coils to be wound of varying electrical characteristics.

In accordance with the above object, one embodiment of the invention comprises a rotating adjustable indexable coupling for supporting one end of a winding arbor supported at its opposite end on a longitudinally yieldable tail stock. Specifically, the coupling includes a longitudinally fixed rotatable member, to which is connected for rotation a longitudinally indexable arbor-engaging and supporting element adjustable to two predetermined positions by means of a pin and slot connection between the member and the element, respectively. An annular slotted collar rotatable on the indexable element, but fixed longitudinally thereon, serves as an abutment for the pin in one position of the arbor-supporting element and a second rotatable collar, screw-threadedly adjustable longitudinally on the member, serves as an abutment for the pin in the other position of the arbor supporting element. By adjusting the screw-threaded collar, the two coils may be wound micrometrically variable distances apart.

Other objects and advantages of the invention will more fully appear from the following detailed description taken in connection with the accompanying drawing, in which Fig. 1 is a fragmentary plan view, partly in section, of one embodiment of an adjustable indexable coupling embodying the features of the invention shown applied to a longitudinally yieldable winding arbor of a coil winding machine used in the winding of duo-lateral wound coils;

Fig. 2 is a longitudinal sectional view of a yieldable tail stock for supporting the right hand end of the winding arbor;

Fig. 3 is a fragmentary vertical longitudinal section, partly in elevation, of the coupling and winding arbor of Fig. 1, taken on the line 3—3 thereof, showing the coupling indexed to another position and the arbor correspondingly moved longitudinally; and Fig. 4 is a vertical section taken on the line 4—4 of Fig. 1.

Referring to the drawing, in which only such parts of the coil winding machine are shown as are necessary to an understanding of the adjustable indexable coupling of the invention, the numeral 10 indicates, in general, a variable position tail stock comprising a counterbored sleeve 11 closed at its right end by a plug 12, the latter end of the sleeve being secured in a standard 13. Reciprocably and rotatably carried in the smaller bore of the sleeve 11 is a counterbored sleeve 14, having a head portion 15 at its right end freely fitting in the enlarged diameter of the bore of the sleeve 11. Pinned to the head portion 15 within the enlarged diameter of the bore of the sleeve 14 is a short rod 17, which freely extends at its right end into the enlarged diameter of the bore of the sleeve 11. A compression spring 18 entered in the latter bore of the sleeve 11 and engaging at its opposite ends the plug 12 and the enlarged head portion 15 of the sleeve 14 normally tends to move the sleeve 14 to the left to maintain the head portion against an annular face 19 at a juncture between the smaller and larger diameters of the bore of the sleeve 11. Reciprocably and rotatably carried in the smaller bore of the sleeve 14 is a shouldered spindle 20, which extends at its inner or right end into the enlarged diameter of the bore of the sleeve 14 and carries a pin 21, which prevents its withdrawal through the outer or left end of the smaller diameter of the bore of the latter sleeve. Interposed between the opposite adjacent ends of the spindle 20 and the rod 17 in the enlarged diameter of the bore of the sleeve 14 is a ball bearing 24 for taking the longitudinal thrust in either direction between the spindle 20 and the rod 17. Removably attached, as indicated at 25, to a reduced diameter of the spindle 20 at its outer or left end is a head 26 having a cone-shaped axial depression 27 for receiving a similarly shaped right end of a coil winding arbor, indicated in general at 28.

In the present illustration of the invention, the arbor 28 is of such length as to accommodate the winding of only two duo-lateral wound coils, but it will be understood that the arbor may be of any suitable length to take care of a greater number of coils. The arbor 28 comprises a generally circular rod 29, having removably and fixedly secured, as indicated at 30 and 31 (Fig. 1), to its opposite ends enlarged heads 34 and 35, respectively. At its outer end, the head 34 is cone-shaped to engage in the cone-shaped depression 27 in the tail stock head 26. The outer end of the head 35 is reduced in diameter and radially extending therethrough is a pin 36, by means of which rotary motion from a rotating adjustable indexable coupling, indicated in general at 37, is transmitted to the arbor 28 in a manner to be presently described. Keyed, as indicated at 38, to the arbor rod 29 for rotation therewith, but freely slidable longitudinally thereof, is a spacing collar 41, the purpose of which, together with pins 42 extending from the right hand end faces of the head 35 and collar, will be described hereinafter.

The coupling 37 embodying the features of the invention comprises a longitudinally fixed cup-shaped shouldered member or head 43 connected by a left-hand screw thread to a driving spindle 44, rotating in the direction of the arrow (Fig. 1). Freely reciprocably carried in a cylindrical depression 45 of the head 43 is a longitudinally indexible arbor-engaging and supporting member 48, having an enlarged circular flange 49 at its right end providing a hand grip. Formed axially in the right hand end face of the flange 49 is a suitable depression 50 for operative engagement with the outer reduced end of the arbor head 35 and the pin 36 thereon. The cup-shaped head 43 has formed in its wall at diametrically opposite sides slots 51 extending longitudinally thereof, in which are freely entered opposite ends of a pin 52 secured to and projecting radially from the member 48. It will be apparent that the slots 51 and pin 52 serve to secure the head 43 and member 48 together for unitary rotation and at the same time permit the member 48 to be longitudinally adjusted to varying positions on the head 43 limited by the lengths of the slots. An annular peripheral groove 55 formed in the head 43 adjacent the right end of the slots 51 has freely rotatable therein an assemblage comprising two similar arc-shaped plates 56, the inner curved faces of which fit and ride upon the bottom face of the groove 55. Opposite rectilinear edge faces 57 of the plates 56 are parallel and spaced apart such a distance, when assembled in the groove 55, at each side of the longitudinal axis of the member 48, that slot-like passages 58 are formed which, upon alignment with the ends of the pin 52, upon rotating the plates 56, permit the pin ends to pass therethrough. With this arrangement, it will be obvious that the ends of the pin 52 may be positioned at either the left or right hand sides of the plates 56 and since the member 48 carries the pin, it moves therewith. Each of the plates 56 intermediate the edge faces 57 and upon their arc-shaped right hand face are shaped, to provide a locking notch 59 for receiving the ends of the pin 52 when aligned therewith upon a rotation of the plates 56 when the member 48 is adjusted to its extreme right-hand operative position, in which case the plates serve as a stop or abutment. Surrounding and welded or brazed to the plates 56 is an internally shouldered collar 62 serving as a hand grip for rotating the stop assemblage. The outer peripheral face of the head 43 is provided with a left-hand screw thread 63 of a micrometrical type on which is threaded a pair of similarly threaded collars 64 and 65, the collar 65 serving as a stop or abutment for the ends of the pin 52 when the member 48 is adjusted to its extreme left-hand position and the collar 64 as a lock collar for maintaining the collar 65 in its adjusted position.

In the use of the above described adjustable indexable coupling 37, as applied to a coil winding machine, including the previously described longitudinally yieldable tail stock 10 and coil winding arbor 28 for winding duo-lateral or cross wound coils, referring particularly to Fig. 1, the arbor rod 29, before being mounted in the position shown, is threaded with two hollow coil cores 68 and the spacing collar 41 arranged therebetween. The bores of the cores 68 fit snugly on the rod 29 and the cores are rotatably secured thereto by the pins 42 on the head 35 and the collar being entered in apertures in the left hand end faces of the cores. Thereafter, the head 34 is secured to the rod 29, after taking up all end play between the head 35, cores 68 and collar 41. The winding arbor 28 is now mounted, as shown in Fig. 1, between the tail stock 10 and the adjustable coupling member 48 and is normally yieldably maintained in position longitudinally against the coupling member by the action of the compression spring 18 of the tail stock.

As shown in Fig. 3, duo-lateral wound coils are indicated in general at 69, and in Fig. 1 it will be assumed that only one coil, indicated at 70, of each of the duo-lateral wound coils has been wound on the cores 68 with wires 71 led from suitable supplies and over associated traverse guides (not shown). With the coils 70 completed, the winding machine is stopped and the winding arbor 28 is moved longitudinally towards the left a predetermined distance. To effect this movement of the arbor 28, the collar 62 is rotated to first withdraw the ends of the pin 52 from the locking notches 59 of the plates 56 secured to the collar and upon completing a 90° rotation thereof, the ends of the pin 52 are in alignment with the passages 58 between the plates 56, whereupon the spring pressed tail stock acting upon the arbor 28 and the latter upon the coupling 48 carrying the pin 52 carries the pin into engagement with the stop collar 65, as shown in Fig. 3.

It will be understood that this latter collar had previously been accurately adjusted longitudinally on the head 43 by means of the micrometer screw thread 63 to provide the desired spacing between the wound coils 70 and companion coils 72 (Fig. 3), the winding of which is to follow, of the duo-lateral wound coils 69. This movement of the arbor 28 carries the wound coils 70 to the left and the coils 72 are then wound on the arbor in the positions formerly occupied by the coils 70 relative to the line of travel of the wires 71. Upon completion of the coils 72, the machine is stopped and the arbor 28, with the wound coils 69 thereon, is removed by pressing the arbor to the right until it is free of the depression 50 in the coupling flange 49, whereupon its opposite end may be withdrawn from the depression 27 in the tail stock head 26. After reloading the machine with an arbor 28 in the manner previously described, the coils 72 are first wound, since the pin 52 is still engaging the stop collar 65, and then the machine is stopped and the collar 62 is rotated to align the passages 58 with the ends of the pin 52. Thereafter, the hand grip flange 49 is used to slide the coupling member 48 carrying the pin 52 to the right to move the pin ends through the passages 58 and to the right side face of the plates 56 and then the plates are rotated 90° to permit the pin ends to enter the locking notches 59 in the plates, the arbor 28 now being positioned for the winding of the coils 70.

From the above description, it will be apparent that a simple and practicable indexable coupling is provided for readily and micrometrically varying the distance between individual coils of duo-lateral wound coils to be wound to provide coils having infinite variations in the electrical characteristics thereof.

It will be understood that the embodiment described is merely illustrative of the invention and one application thereof and that modifications can be made and it is capable of other applications.

What is claimed is:

1. In a coil winding apparatus having a longitudinally yieldable winding arbor, a rotatable longitudinally indexable coupling for supporting one end of said arbor, said coupling including a pair of stop members for supporting said arbor in different longitudinal positions, one of said stop members being fixed and the other stop member being micrometrically adjustable to and from said first stop member.

2. In a coil winding apparatus having a winding arbor, means for yieldably supporting said arbor at one end to permit longitudinal adjustment thereof, a rotatable longitudinally indexable coupling operatively engaging the other end of said arbor to support and rotate the same, said coupling including a pair of stop members for supporting said arbor in different longitudinal positions, one of said stop members being fixed longitudinally and the other stop member being rotatably mounted and micrometrically adjustable to and from said first stop member.

3. In a coil winding apparatus having a longitudinally yieldable winding arbor, an adjustable indexable coupling for engaging and supporting said arbor in a plurality of longitudinal positions comprising a rotating member, means reciprocably carried by and rotatable with said member adapted to operatively engage and support at one end said arbor for rotation, an abutment on said means, and spaced adjustable means on said member alternately engageable with said abutment to hold said reciprocable means in a plurality of positions and thereby said arbor, one of said adjustable means being adjustable longitudinally of said member for varying the distance between said positions, the other of said adjustable means being longitudinally fixed to and rotatable on said member and having a slot for the passage of said abutment after alignment therewith when either of said adjustable means is used to hold said reciprocable means at one of said positions.

4. In a coil winding apparatus having a winding arbor, means for yieldably supporting said arbor at one end to permit longitudinal adjustment thereof, a rotatable longitudinally indexable coupling operatively engaging the other end of said arbor to support and rotate the same, said coupling comprising a longitudinally fixed rotating cup-shaped member, means reciprocable therein to a plurality of positions adapted to engage and support said other end of said arbor for rotation, a pin extending radially from said means and into slots in said member for rotatably connecting said member and means, and a pair of rotatable stop members on said cup-shaped member engageable by said pin for holding said arbor in different longitudinal positions, one of said stop members being micrometrically adjustable to and from the other stop member and the latter stop member being longitudinally fixed relative to said first stop member and having a slot for the passage of said pin after alignment therewith when either of said stop members is used to hold said reciprocable means at one of said positions.

5. An adjustable indexing coupling for rotatably engaging and supporting one end of a longitudinally yieldable and rotatable element comprising a rotatable cup-shaped member, means reciprocable therein to a plurality of positions adapted to engage and support said one end of said element for rotation, a pin carried by said means engaging in a slot in said member for rotatably connecting said member and means, and spaced stop collars on said member for alternately engaging said pin to hold said means at said positions, one of said stop collars being adjustable longitudinally of said member for varying the distance between said positions, the other of said stop collars being longitudinally fixed to and rotatable on said member and having a slot for the passage of said pin after alignment therewith when either of said stop collars is used to hold said means at one of said positions.

6. An adjustable indexing coupling for rotatably engaging and supporting one end of a longitudinally yieldable and rotatable element comprising a peripherally slotted rotatable member, means therein carrying a pin slidable in said slot and projecting from one end of said slotted member, rotatable therewith and movable to a plurality of positions longitudinally of said element adapted to engage and support said one end of said element for rotation, and spaced stop collars on said member for alternately engaging said pin to hold said means at said positions, one of said stop collars being threadedly adjustable longitudinally of said member for either minutely or greatly varying the distance between said positions, the other of said stop collars being longitudinally fixed to and rotatable on said member and having a slot for the passage of said pin after alignment therewith when either of said stop collars is used to hold said means at one of said positions.

7. An adjustable coupling for rotatably supporting a longitudinally movable arbor comprising a body portion having a longitudinally extending aperture therein and provided with a longitudinal slot, an arbor engaging member extending into said aperture and having a pin projecting through said slot, the outer surface of said body portion being threaded, and a plurality of means on said body portion and cooperating alternately with said pin for positioning said arbor-engaging member, one of said means being longitudinally adjustable on said threaded surface, the other of said means being longitudinally fixed to and rotatable on said body portion and adapted, in one rotated position, to permit said pin to pass from one side to the other side thereof when shifting from one to the other of said means to hold said arbor-engaging member in position.

8. An adjustable coupling for rotatably supporting a longitudinally movable arbor comprising a body portion having a longitudinally extending aperture therein and provided with a longitudinal slot, an arbor-engaging member extending into said aperture and having a pin projecting through said slot, means adjustable longitudinally on said body portion and engageable with said pin for positioning said arbor-engaging member in a plurality of positions, and means longitudinally fixed to and rotatable on said body portion and having a slot for the passage of said pin after alignment therewith when either the adjustable means or the latter longitudinally fixed means is used to hold said arbor-engaging member in position.

EDWIN H. LANE.